United States Patent
Li

[19]

[11] Patent Number: 6,128,149
[45] Date of Patent: Oct. 3, 2000

[54] METHOD AND SYSTEM FOR DETECTING COMMON MODE DISTURBANCES FROM A DUAL STRIPE MAGNETORESISTIVE HEAD

[75] Inventor: Robert Yuan-Shih Li, Fremont, Calif.

[73] Assignee: International Business Machines Corporation, Armonk, N.Y.

[21] Appl. No.: 09/178,086

[22] Filed: Oct. 23, 1998

[51] Int. Cl.[7] .............................. G11B 5/03; G11B 15/12; G11B 5/02
[52] U.S. Cl. ................................. 360/66; 360/61; 360/67; 360/25
[58] Field of Search ................................ 360/66, 61, 46, 360/67, 25

[56] References Cited

U.S. PATENT DOCUMENTS

| | | | |
|---|---|---|---|
| 5,057,785 | 10/1991 | Chung et al. | 328/162 |
| 5,233,482 | 8/1993 | Galbraith et al. | 360/46 |
| 5,357,388 | 10/1994 | Smith | 360/113 |
| 5,420,736 | 5/1995 | Heim et al. | 360/113 |
| 5,527,110 | 6/1996 | Abraham et al. | 374/5 |
| 5,581,427 | 12/1996 | Feng et al. | 360/113 |
| 5,696,654 | 12/1997 | Gill et al. | 360/113 |
| 5,701,222 | 12/1997 | Gill et al. | 360/113 |
| 5,701,314 | 12/1997 | Armstrong et al. | 371/40.3 |
| 5,706,151 | 1/1998 | Smith | 360/113 |
| 5,708,542 | 1/1998 | Takada et al. | 360/113 |
| 6,005,733 | 12/1999 | Schuelke et al. | 360/66 |

*Primary Examiner*—W. Chris Kim
*Attorney, Agent, or Firm*—Noreen A. Krall; Felsman, Bradley, Vaden, Gunter & Dillon, LLP

[57] ABSTRACT

A method and system for detecting common mode disturbances from a magnetic recording head having dual magnetic recording elements. An electrical current is supplied to both of the dual magnetic recording elements within the magnetic recording head. Thereafter, the electrical current is shunted through only one of the dual magnetic recording elements. A voltage signal is then detected across the dual magnetic recording elements, which occurs in response to the shunting of the electrical current through only one of the dual magnetic recording elements. Finally, the voltage signal is analyzed for indications of common mode disturbances accentuated as a result of the shunting of the electrical current through only one of the dual magnetic recording elements. Common mode disturbances that can be detected include thermal asperities.

14 Claims, 4 Drawing Sheets

METHOD AND SYSTEM FOR DETECTING COMMON MODE DISTURBANCES FROM A DUAL STRIPE MAGNETORESISTIVE HEAD

BACKGROUND OF THE INVENTION

1. Technical Field

The present invention relates in general to magnetic sensors for reading information signals stored on magnetic media. In particular, the present invention relates to magnetoresistive heads which record and read data to and from magnetic media. More particularly, the present invention relates to dual stripe magnetoresistive heads. Still more particularly, the present invention relates to techniques for detecting common mode disturbances in magnetic media utilizing dual stripe magnetoresistive heads.

2. Description of the Related Art

Computers often include auxiliary memory storage units having media on which data can be written and from which data can be read for later use. Magnetic disk drive units reliably store user information in the form of digital data. Inside the disk drive, the digital data serves to modulate current in a read/write head coil in order to write a sequence of corresponding magnetic flux transitions onto the surface of a magnetic medium in concentric, radially spaced tracks at a predetermined baud rate.

Transducer heads driven in a path toward and away from the disk drive axis write and read data to and from the disks. A slider supports one or more magnetic heads. As the disk is brought up to operating speed, an air bearing is generated which moves each slider and hence the heads away from the recording surface toward a preselected flying height. Achievement of a higher data density on magnetic disks has imposed increasingly narrow transducer gaps. When reading recorded data, the read/write head passes over the magnetic medium (i.e., disk)and transduces the magnetic transitions into pulses in an analog read signal that alternate in polarity. These pulses are then decoded by read channel circuitry to produce an estimated digital sequence that may contain errors caused by channel noise that obfuscate the read signal. To compensate for these errors, an error detection and correction (EDAC) system can be utilized to implement an error correction code (ECC) in order to detect and correct the errors to reproduce the originally recorded user data before passing it on to a host computer. However, such EDAC systems, by themselves, cannot accurately detect common mode disturbances in the magnetic media.

Magnetoresistive (MR) heads are well known in the art and are constructed and manufactured integral with disk drives. A magnetoresistive head comprises a magnetoresistive stripe element that measures the change in the magnetic flux directly. The resistance of the magnetoresistive stripe is inversely proportional to the strength of the magnetic flux. The resistance of the magnetoresistive stripe increases as it approaches a magnetic flux transition. When a constant current is passed through the magnetoresistive stripe, the voltage measured across it represents an analog read signal and corresponding polarity alternating pulses. Typical magnetoresistive heads thus exhibit changes in resistance in the presence of a changing magnetic field. This resistance change is transformed into a voltage signal by passing a constant current through the magnetoresistive element. The value of DC voltage, for a given head, is the product of the constant bias current and the total resistance between the head lead terminals. The temperature coefficient of resistivity of the magnetoresistive material is approximately 0.02%/ degree C.

Dual magnetoresistive heads are well known in the art. Typical dual magnetoresistive heads contain good common mode rejection. However, during the manufacturing of a disk drive in which dual magnetoresistive heads are to be implemented, it is advantageous to easily detect common mode disturbances (e.g., thermal asperities) ahead of time so that such disturbances can be either screened out or utilized to gauge the cleanliness of the manufacturing processes. The same problem can also exist in a completed disk drive. When new disturbances occur, it is useful to have knowledge of their characteristics or signatures, such as thermal asperities, for invoking proper channel actions to recover the data.

Thermal asperities can locally increase the stripe temperature by more than 100 C degrees. The cause of this temperature rise is a mechanical collision of a portion of the head containing the magnetoresistive stripe with a protrusion on the disk surface. Since the change in resistance, as a function of the magnetic field due to read signal in the media, is less than 1% of the total magnetoresistive stripe resistance, the signal step that is added to the read signal when a thermal asperity is encountered can be greater than twice the base-to-peak read signal. An increase in the temperature of the stripe of 100 C degrees can cause a resistance change and a voltage change of 2%.

When the protrusion on the disk is persistent and the head continues to strike it each revolution, then the data that is being modulated by the resultant thermal induced signal transient becomes unreadable. A thermal asperity is essentially a transient in the read signal that appears when a magnetoresistive read head physically strikes an asperity on the surface of the disk, which can significantly increase the temperature of the magnetoresistive stripe element. Because the resistivity of the magnetoresistive stripe increases with temperature, a thermal asperity can cause significant transient in the analog read signal that decays exponentially.

Known arrangements for minimizing the effect of thermal asperities on the read data utilize a separate circuit asperity reduction circuit (ARC) module for additive disturbance transient suppression for data channels. Disadvantages of the known arrangements include the hardware required and the corresponding electronics cost and the required error burst length for a given thermal transient amplitude. The relatively long error site limits its applications. For example, because much more redundancy in the error correcting code or compensation (ECC) is required than is tolerable for small fix-blocked formatted drives.

Those skilled in the art will appreciate that the detection of thermal asperities and common mode disturbances is necessary since such disturbances can affect the head disk interface and the presence of too many thermal asperities on a disk surface may lead to a head disk drive "crash." Further, the knowledge that a particular defect is caused by a thermal asperity may permit special error code correction techniques to be invoked to permit recovery of data stored within the drive. Based on the foregoing, it can be appreciated that what is needed to alleviate the aforementioned drawbacks is a method and system which takes advantage of existing electrical components to detect thermal asperities and other common mode disturbances during the manufacture of a disk drive or in a subsequently completed disk drive. The invention described herein takes advantage of existing hardware and signal paths to efficiently and readily detect common mode disturbances.

SUMMARY OF THE INVENTION

It is therefore an object of the invention to provide an improved magnetic sensor for reading information signals stored on a magnetic media.

It is another object of the invention to provide improved dual stripe magnetoresistive recording heads for detecting common mode disturbances in magnetic media.

It is still another object of the invention to provide an improved method and system for detecting common mode disturbances in magnetic media utilizing dual stripe magnetoresistive heads.

It is yet another object of the invention to provide an improved method and system for detecting thermal asperities in magnetic media utilizing dual stripe magnetoresistive heads.

The above and other objects are achieved as is now described. A method and system for detecting common mode disturbances in a magnetic recording head having dual magnetic recording elements. An electrical current is supplied to both of the dual magnetic recording elements within the magnetic recording head. Thereafter, the electrical current is shunted through only one of the dual magnetic recording elements. A voltage signal is then detected across the dual magnetic recording elements, which occurs in response to the shunting of the electrical current through only one of the dual magnetic recording elements. Finally, the voltage signal is analyzed for indications of common mode disturbances accentuated as a result of the shunting of the electrical current through only one of the dual magnetic recording elements. Common mode disturbances that can be detected include thermal asperities.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
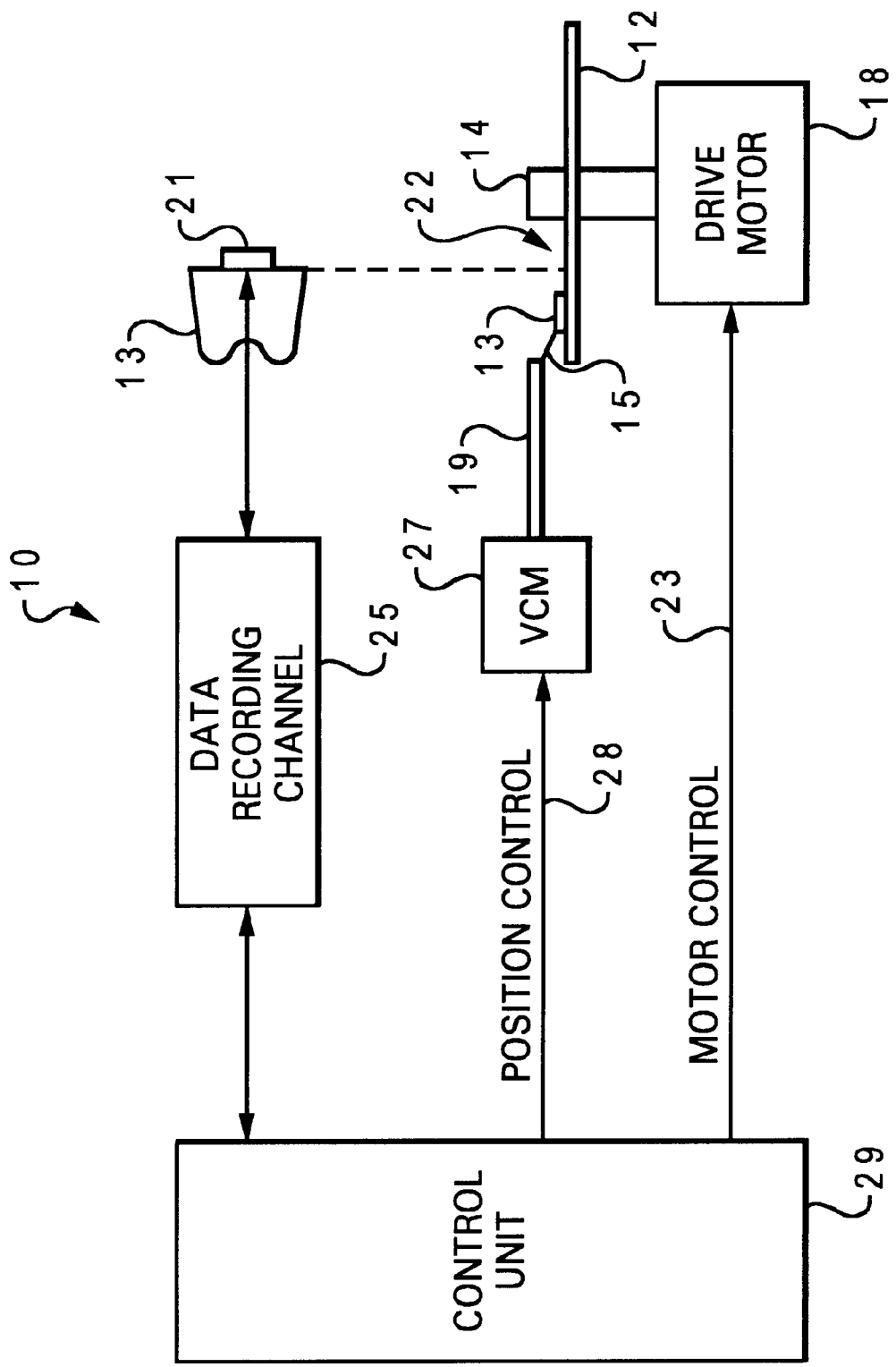
FIG. 1 is a block diagram of a magnetic disk storage system which may be utilized in accordance with a preferred embodiment of the present invention.

With reference now to the figures and in particular with reference to FIG. 1, there is depicted a block diagram of a magnetic disk storage system 10 which may be utilized in accordance with a preferred embodiment of the present invention. Referring now to FIG. 1, although the invention is described in the context of a magnetic disk storage system as shown in FIG. 1, it can be appreciated by those skilled in the art that the invention is also applicable to other magnetic recording systems, such as a magnetic tape recording system, for example, or other applications in which a sensor is utilized to detect a magnetic field. Magnetic disk storage system 10 comprises at least one rotatable magnetic disk 12 which is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or magnetic read/write transducers 21, typically referred to as read/write heads. As the disks 12 rotate, the sliders are moved radially in and out over the disk surface 22, so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example, although those skilled in the art will appreciate that a VCM is not necessary to implement a preferred embodiment of the present invention. The VCM comprises a coil moveable within a fixed magnetic field, the direction and velocity of the coil movements being controlled by the motor current signals supplied by a controller.

During the operation of disk storage system 10, the rotation of disk 12 generates an air bearing between the slider 13 and disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals line 28. The control signals on line 28 provide the desired current profiles to optimally move and position a selected slider 13 to the desired data track on the associated disk 12. Read and write signals are communicated to and from read/write heads 21 by means of a recording channel 25. The above description of a typical magnetic disk storage system, and the accompanying illustration of FIG. 1 are for representation purposes only. It should be apparent that disk storage systems may contain a large number of sliders.

Figure 2:
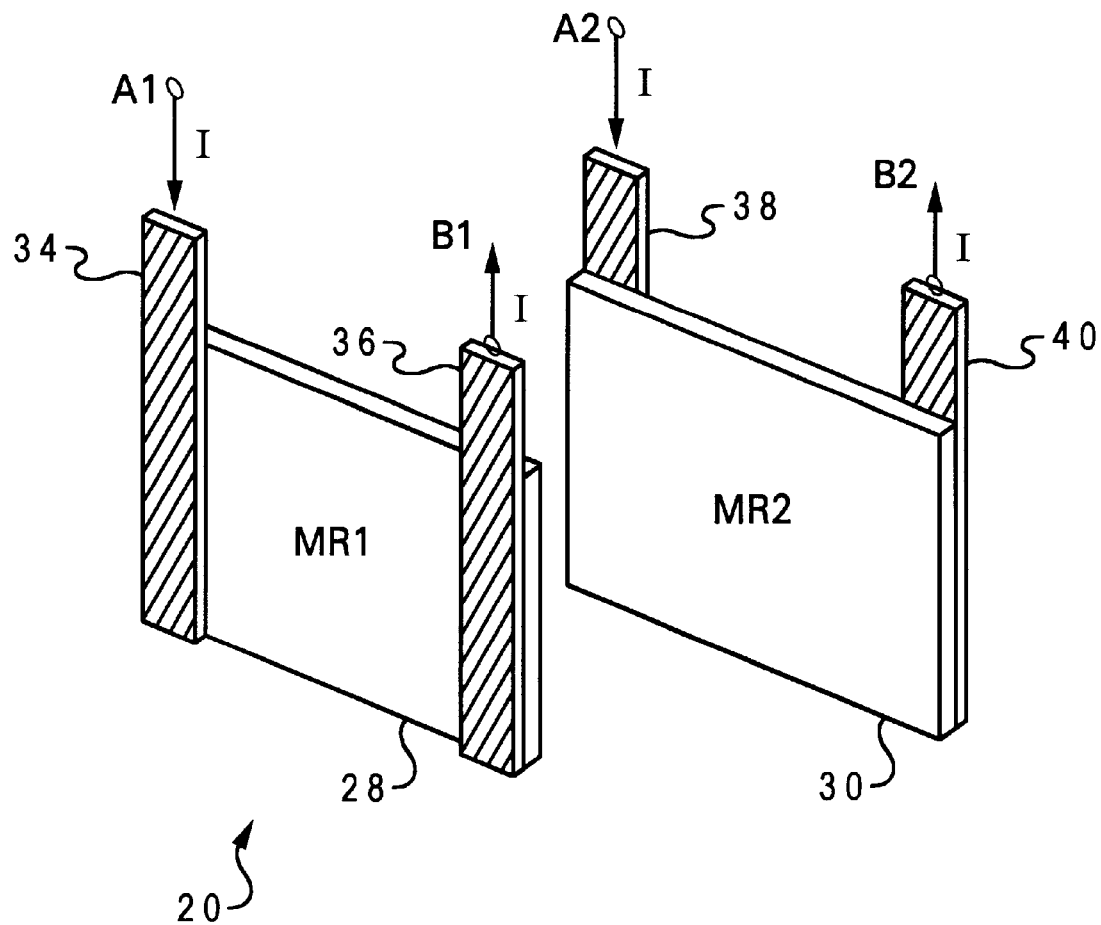
FIG. 2 is a pictorial diagram illustrating individual components of a dual stripe magnetoresistive head, in accordance with a preferred embodiment of the present invention.

FIG. 2 is a pictorial diagram illustrating individual components of a dual stripe magnetoresistive head 20, in accordance with a preferred embodiment of the present invention. The dual stripe magnetoresistive head 20 is composed of two magnetoresistive elements, magnetoresistive element 28 (i.e., MR1) and magnetoresistive element 30 (i.e., MR2). Each magnetoresistive element may be composed of a magnetically soft ferromagnetic material. Each magnetoresistive element includes magnetoresistive stripes. For example, magnetoresistive element 28 includes magnetoresistive stripes 34 and 36. Magnetoresistive element 30 includes magnetoresistive stripes 38 and 40. A current I driven through each magnetoresistive stripe creates an associated magnetic field. Magnetic fields and direction arrows are indicated in FIG. 2 as A1, B1 for magnetoresistive element 28, and A2, B2 for magnetoresistive element 30.

Figure 3:
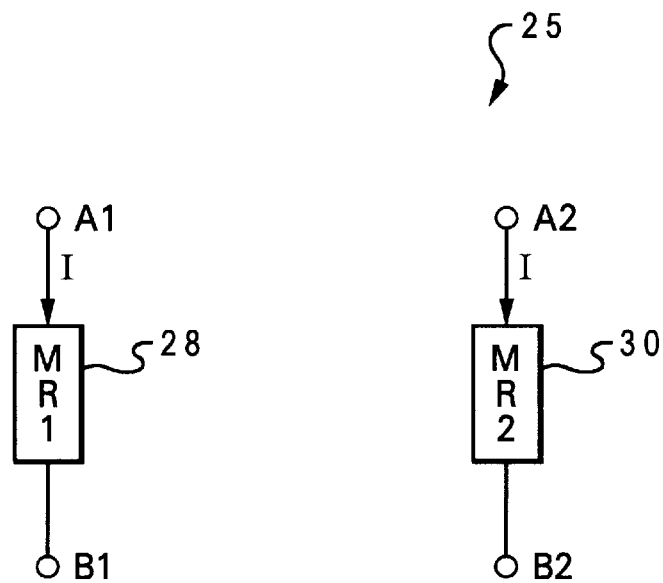
FIG. 3 is a schematic diagram representative of a four-terminal dual magnetoresistive stripe configuration, in accordance with a preferred embodiment of the present invention.
Figure 4:
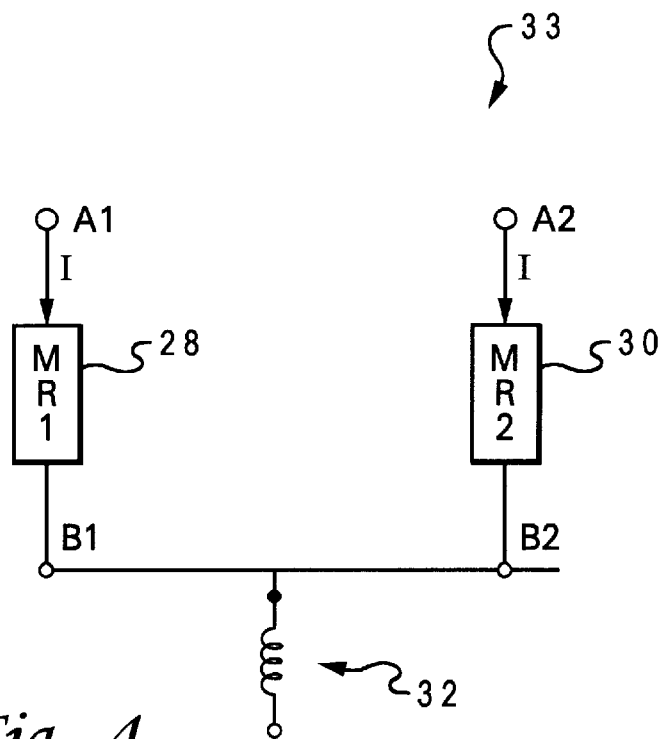
FIG. 4 is a schematic diagram representative of a three-terminal dual magnetoresistive stripe configuration, in accordance with a preferred embodiment of the present invention.

FIG. 3 is a schematic diagram 25 representative of a four-terminal dual magnetoresistive stripe configuration, in accordance with a preferred embodiment of the present invention. In FIG. 2 to FIG. 5, like parts are indicated by like reference numerals, such that the four terminals A1, B1, A2, and B2 indicated in FIG. 3 are associated with A1, B1, A2, and B2 of FIG. 2. FIG. 4 is a schematic diagram 33 representative of a three-terminal dual magnetoresistive stripe configuration, in accordance with a preferred embodiment of the present invention. In FIG. 4, B1 is coupled to B2 at inductor 32. Reading the differential voltage developed across MR1 and MR2 promotes the cancellation of a great deal of common mode signals, such as that due to thermal asperities. However, by masking thermal asperities, a hard drive runs the risk of head crashes (i.e., HDI). By measuring and analyzing only a single voltage developed across wither MR1 or MR2, thermal asperities can be unmasked and readily detected during manufacturing of disk drives and additionally, for thermal asperity and data recovery purposes.

Figure 5:
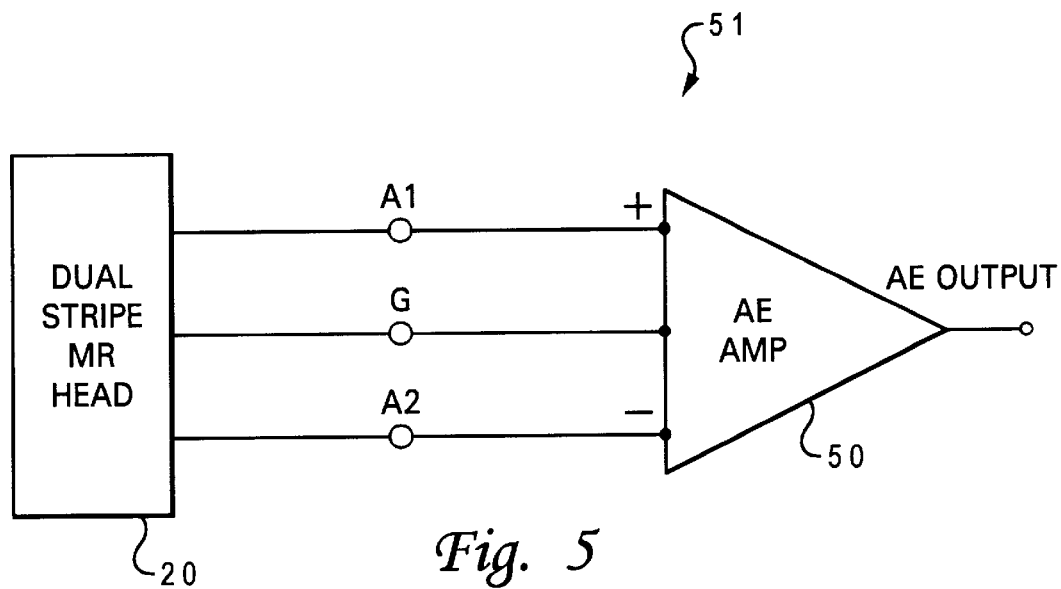
FIG. 5 is a high-level schematic diagram of an electrical circuit which may be utilized to detect thermal asperities, in accordance with a preferred embodiment of the present invention.

FIG. 5 is a high-level schematic diagram of an electrical circuit 51 which may be utilized to detect thermal asperities, in accordance with a preferred embodiment of the present invention. Circuit 51 includes a dual stripe magnetoresistive head 20 coupled to an amplifier 50 via nodes A1, G, and A2.

The circuit configuration depicted in FIG. 5 permits a user to utilize a readback signal from only one of the dual MR elements (e.g., A1 or A2), thus accentuating common mode disturbances, such as thermal asperities, for detection.

Figure 6:
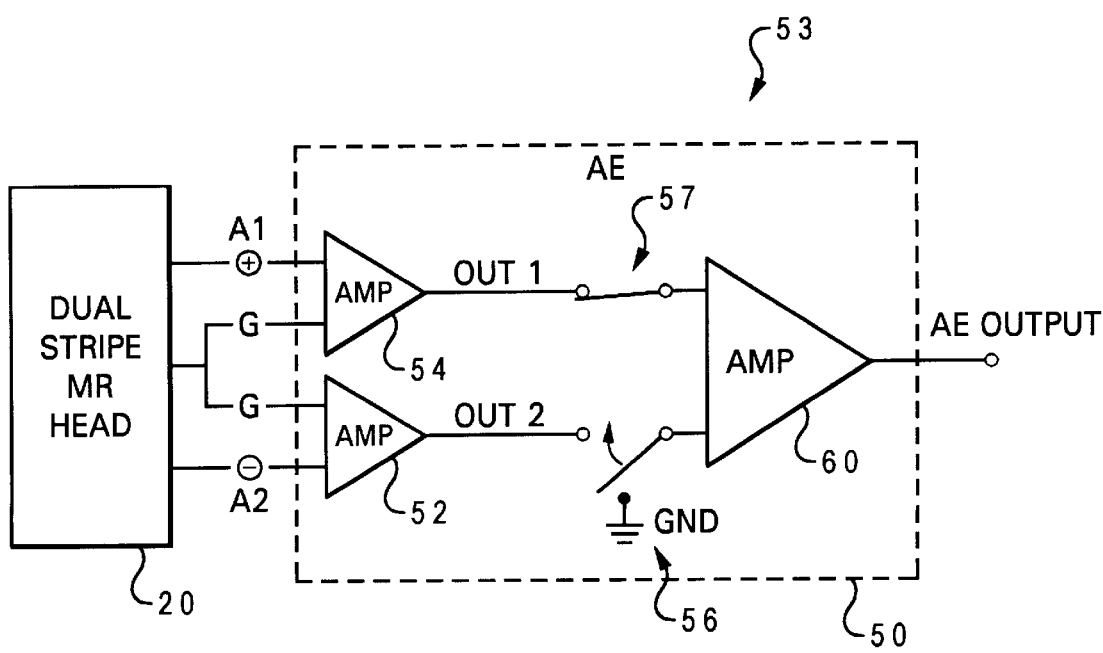
FIG. 6 is a detailed schematic diagram of an electrical circuit which may be utilized to detect thermal asperities, in accordance with a preferred embodiment of the present invention.

FIG. 6 is a detailed schematic diagram of an electrical circuit 53 which may be utilized to detect thermal asperities, in accordance with a preferred embodiment of the present invention. Electrical circuit 53 is a modified version electrical circuit 51 of FIG. 5. The amplifier 50 of FIG. 5 is also depicted in FIG. 6, with the difference being that the amplifier 50 of FIG. 6 is composed of several smaller amplifiers, including amplifiers 52 and 54 which are coupled via outputs OUT1 and OUT2 to the inputs of amplifier 60, whose output provides an overall AE OUTPUT. Amplifier 54 includes inputs coupled to A1 (positive node) and one of two G nodes coupled to dual stripe magnetoresistive head 20. Amplifier 54 includes inputs coupled to A2 (negative node) and the other G node coupled to dual stripe magnetoresistive head 20. A controlled switch 57 lies in the path between OUT1 and the input to amplifier 60. A controlled switch 56 lies in the path between OUT2 and amplifier 60. In the circuit configuration illustrated in FIG. 6, controlled switch 56 is connected to ground, and essentially lies in the readback path of a control line (i.e., OUT2). When activated, the controlled switch 56 shorts out across A1 and G or A2 and G, again accentuating common mode disturbances, such as thermal asperities, thereby permitting a readily available method for detecting such common mode disturbances. Those skilled in the art can appreciate that circuits 51 and 53 can be further modified, and still perform the function intended (i.e., detecting thermal asperities). For example, a shunt can be placed across OUT2. By disabling the differential MR voltages, then any thermal asperity disturbance will be propagated to the channel or other thermal asperity detection circuitry for easy capture.

Thus, while the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for detecting common mode disturbances from a magnetic recording head having dual magnetic recording elements, said method comprising the steps of:

supplying an electrical current to both of said dual magnetic recording elements within said magnetic recording head;

thereafter shunting said electrical current through only one of said dual magnetic recording elements;

detecting a voltage signal across said dual magnetic recording elements, which occurs in response to said shunting of said electrical current through only one of said dual magnetic recording elements; and analyzing said voltage signal for indications of common mode disturbances accentuated as a result of said shunting of said electrical current through only one of said dual magnetic recording elements.

2. The method of claim 1 wherein the step of detecting a voltage signal across said dual magnetic recording elements, which occurs in response to said shunting of said electrical current through only one of said dual magnetic recording elements, further comprises the step of:

detecting a readback signal across said dual magnetic recording elements, which occurs in response to said shunting of said electrical current through only one of said dual magnetic recording elements.

3. The method of claim 2 wherein the step of analyzing said voltage signal for indications of common mode disturbances accentuated as a result of said shunting of said electrical current through only one of said dual magnetic recording elements, further comprises the step of:

analyzing said readback signal for common mode disturbances accentuated as a result of said shunting of said electrical current through only one of said dual magnetic recording elements.

4. The method of claim 3 wherein the step of detecting a readback signal across said dual magnetic recording elements, which occurs in response to said shunting of said electrical current through only one of said dual magnetic recording elements, further comprises the step of:

detecting a readback signal in a readback path across said dual magnetic recording elements, which occurs in response to said shunting of said electrical current through only one of said dual magnetic recording elements.

5. The method of claim 4 wherein the step of supplying an electrical current to both of said dual magnetic recording elements within said magnetic recording head, further comprises the step of:

supplying an electrical current to both of said dual magnetic recording elements within said magnetic recording head, wherein said magnetic recording head comprises a magnetoresistive recording head.

6. The method of claim 5 wherein the step of supplying an electrical current to both of said dual magnetic recording elements within said magnetic recording head, further comprises the step of:

supplying an electrical current to both of said dual magnetic recording elements within said magnetic recording head, wherein said dual magnetic recording elements comprise dual magnetoresistive stripes within said dual magnetoresistive recording head.

7. The method of claim 6 wherein the step of analyzing said voltage signal for indications of common mode disturbances accentuated as a result of said shunting of said electrical current through only one of said dual magnetic recording elements, further comprises the step of:

analyzing said voltage signal for indications of common mode disturbances, including thermal asperities, accentuated as a result of said shunting of said electrical current through only one of said dual magnetic recording elements.

8. A system for detecting common mode disturbances from a magnetic recording head having dual magnetic recording elements, said system comprising:

means for supplying an electrical current to both of said dual magnetic recording elements within said magnetic recording head;

means for thereafter shunting said electrical current through only one of said dual magnetic recording elements;

means for detecting a voltage signal across said dual magnetic recording elements, which occurs in response to said shunting of said electrical current through only one of said dual magnetic recording elements; and means for analyzing said voltage signal for indications of common mode disturbances accentuated as a result of said shunting of said electrical current through only one of said dual magnetic recording elements.

9. The system of claim 8 wherein said means for detecting a voltage signal across said dual magnetic recording elements, which occurs in response to said shunting of said electrical current through only one of said dual magnetic recording elements, further comprises:

means for detecting a readback signal across said dual magnetic recording elements, which occurs in response to said shunting of said electrical current through only one of said dual magnetic recording elements.

10. The system of claim 9 wherein said means for analyzing said voltage signal for indications of common mode disturbances accentuated as a result of said shunting of said electrical current through only one of said dual magnetic recording elements, further comprises:

means for analyzing said readback signal for common mode disturbances accentuated as a result of said shunting of said electrical current through only one of said dual magnetic recording elements.

11. The system of claim 10 wherein said means for detecting a readback signal across said dual magnetic recording elements, which occurs in response to said shunting of said electrical current through only one of said dual magnetic recording elements, further comprises:

means for detecting a readback signal in a readback path across said dual magnetic recording elements, which occurs in response to said shunting of said electrical current through only one of said dual magnetic recording elements.

12. The system of claim 11 wherein said means for supplying an electrical current to both of said dual magnetic recording elements within said magnetic recording head, further comprises:

means for supplying an electrical current to both of said dual magnetic recording elements within said magnetic recording head, wherein said magnetic recording head comprises a magnetoresistive recording head.

13. The system of claim 12 wherein said means for supplying an electrical current to both of said dual magnetic recording elements within said magnetic recording head, further comprises:

means for supplying an electrical current to both of said dual magnetic recording elements within said magnetic recording head, wherein said dual magnetic recording elements comprise dual magnetoresistive stripes within said dual magnetoresistive recording head.

14. The system of claim 13 wherein said means for analyzing said voltage signal for indications of common mode disturbances accentuated as a result of said shunting of said electrical current through only one of said dual magnetic recording elements, further comprises:

means for analyzing said voltage signal for indications of common mode disturbances, including thermal asperities, accentuated as a result of said shunting of said electrical current through only one of said dual magnetic recording elements.

\* \* \* \* \*